ated: Aug. 29, 1972

United States Patent
Doty

[15] 3,686,799
[45] Aug. 29, 1972

[54] CONVERTIBLE SAW BLADE

[72] Inventor: Myrle M. Doty, 818 Stevens Ave., Sycamore, Ill. 60178

[22] Filed: Feb. 25, 1971

[21] Appl. No.: 118,890

[52] U.S. Cl. ................51/181 R, 7/13 R, 125/18
[51] Int. Cl. .................................B24b 25/00
[58] Field of Search..........125/18; 51/181; 145/33 E; 7/13; 143/133

[56] References Cited

UNITED STATES PATENTS 785,264  3/1905  Maier ..................51/181

FOREIGN PATENTS OR APPLICATIONS 536,548  12/1955  Italy..........................125/18
770,800  3/1957  Great Britain ..........145/33 E Primary Examiner—Harold D. Whitehead
Attorney—Mann, Brown, McWilliams & Bradway

[57] ABSTRACT

A convertible saw blade which may have a curvilinear cutting portion for self starting. The cutting edge of the blade is provided with customary teeth having angular sets to the opposite sides of said body. The teeth are used for relatively soft material. A cutting rod of wear resistant material with abrasive particles therein is detachably fitted over the teeth between the tips of the teeth for use of the blade with harder materials.

11 Claims, 8 Drawing Figures

PATENTED AUG 29 1972 3,686,799

INVENTOR.
Myrle M. Doty
BY Mann, Brown, McWilliams & Bradway
Attorneys.

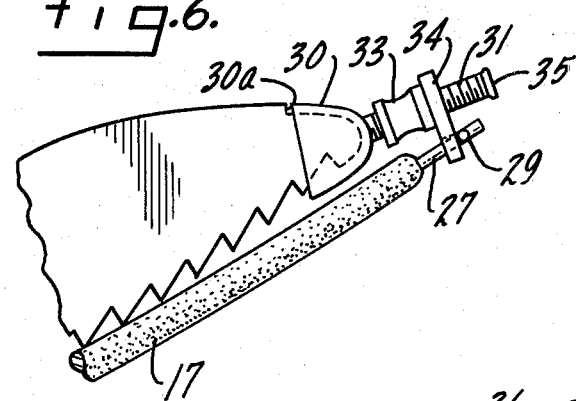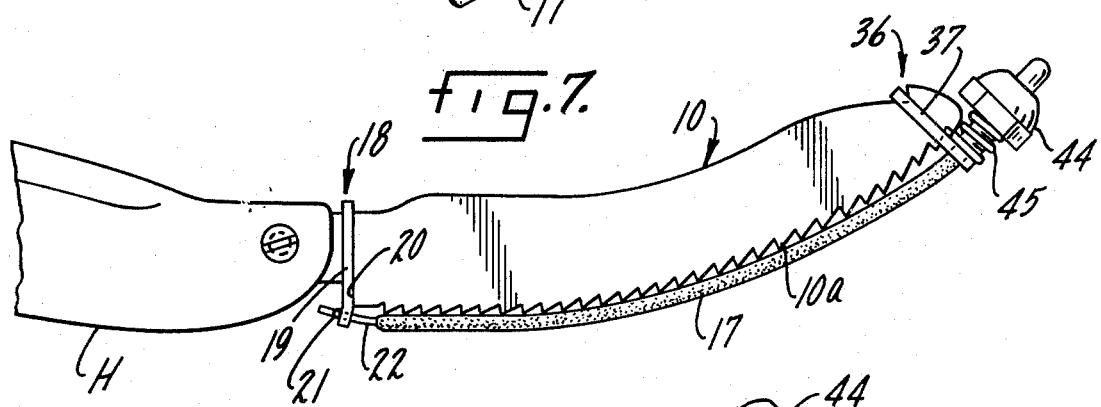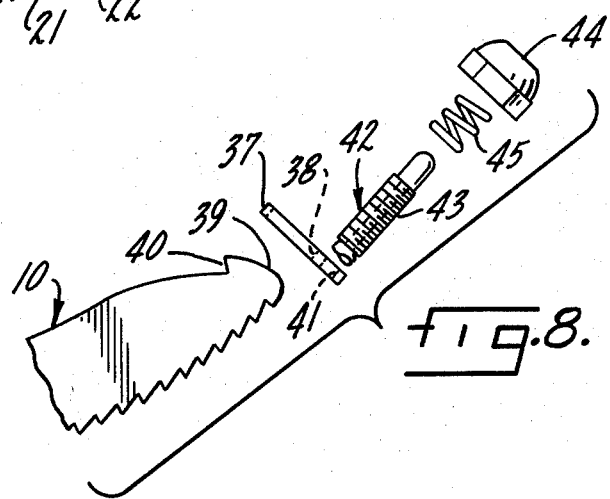

CONVERTIBLE SAW BLADE

The present invention is directed to new and useful improvements in convertible saw blades which are especially adapted for use in cutting either hard or soft materials.

The present invention is particularly concerned with improvements which allow a blade to be used with relatively soft materials such as wood and soft metals while the blade is convertible for use with harder materials such as glass, hard metals, etc. The invention may be embodied advantageously with self starting curvilinear blades of the type disclosed in my prior U.S. Pat. No. 3,477,479.

Other purposes of the present invention are to provide a saw blade of this class which may be used easily with a power saw such as a saber saw or with a simple handle, to provide a novel mounting for a wear resistant, abrasive particle carrying cutting rod which provides support for the rod along the length thereof while allowing simple coupling and uncoupling of the rod to the support and while at the same time providing for air circulation at the adjacent areas of the support and rod to dissipate heat from the rod.

These and other purposes of the present invention will become more apparent in the course of the ensuing specification and claims when taken with the accompanying drawings, in which:

FIG. 6 is a side view of a modified tension-applying coupling for the rod and blade body illustrated in FIGS. 2–5;

FIG. 7 is a side view of a modified form of the invention; and

FIG. 8 is an exploded view of a coupling shown in FIG. 7.

Like elements are designated by like characters throughout the specification and drawings.

Figure 1:
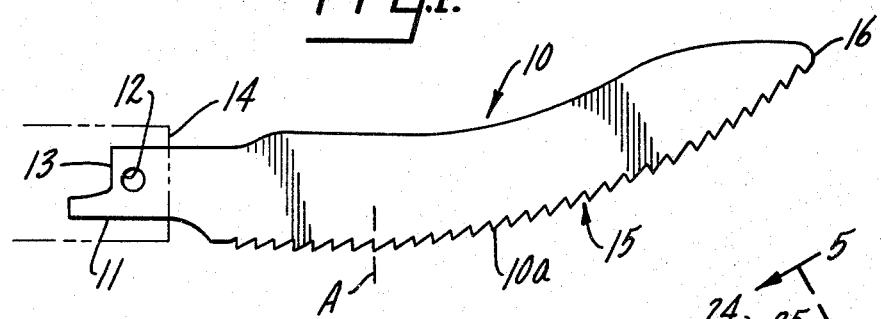
FIG. 1 is a side view of a typical saw blade with which the present invention may be used.

With specific reference now to the drawings, and in the first instance to FIG. 1, the numeral 10 generally designates an elongated blade body which may be of plate-like steel stock. The blade body has a shank end portion 11 which is formed with a holding aperture 12, and a shoulder 13 for reception within the chuck of a portable power saber saw which is represented in dotted lines at 14 in FIG. 2. It should be understood that the general configuration of the shank end portion 11 is intended to be representative of a conventional shank end portion of a saw blade which is used with a reciprocating saber saw.

Figure 2:
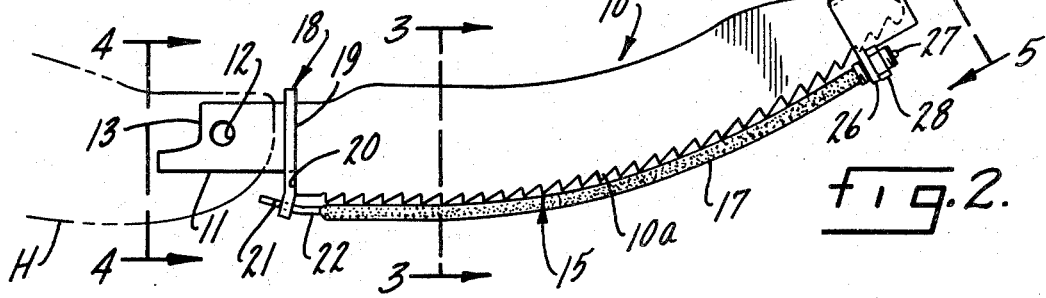
FIG. 2 is a side view of a saw blade incorporating the principles of the blade illustrated in FIG. 1 while illustrating the use of a cutting rod attached to the blade body in FIG. 1.

In lieu of use with a power tool, the blade may be used with a manipulating handle generally designated at H in FIGS. 2 and 7.

The blade body 10 has one side edge 15 thereof formed with saw teeth 10a which are given a rearward rake or a rake extending toward the shank end portion of the body. This side edge of the blade body has a rectilinear expanse from the point generally designated at A and extending to or near the shank end portion. This rectilinear edge portion may form a major part of the overall length of the saw blade or a minor part thereof. The toothed side edge 15 of the blade body from the point A to the forward end 16 has a curvilinear form and may be struck about a center at B which is positioned inwardly of the extreme end of the blade body and to one side of the blade body, as described in my U.S. Pat. No. 3,477,479. This curvature or the side edge between the end 16 and point A is such that it is tangent to the rectilinear portion of the toothed edge.

The blade as disclosed in FIG. 1 is especially adapted for cutting wood and soft metal. The curvature of the blade, as disclosed in said patent, enables the self starting characteristics of the blade. The blade, as disclosed in said patent, may also be used for conventional cutting operations.

In accordance with the present invention an elongated rod 17 is adapted to be fitted over the teeth of the blade. Rod 17 is formed from a wear resistant material such as tungsten carbide. Materials of this type for cutting hard metals, glass, and other hard materials are known to the art. One example is disclosed in U.S. Pat. No. 3,023,490. Material of this type carries cutting or abrasive grains which are embedded in a matrix of material. Material of this type is available in elongated rod-like form and has been known as an attachment for a conventional hack saw blade as a substitute for the normal hack saw blade.

Figure 3:
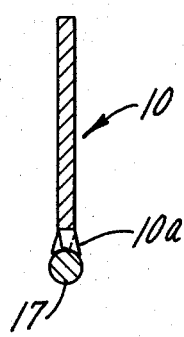
FIG. 3 is an end view of a portion of the saw blade body illustrated in FIG. 2 and taken along the section line 3—3 of FIG. 2.

Cutting rod 17 is positioned over the teeth of the saw blade. The teeth of the saw blade are given a set so as to define a more or less V-shaped valley therebetween as will be seen in FIG. 3. This set is such that the tips of the teeth define a cross-sectional width greater than the thickness of the saw blade. Adjacent teeth in the blade are given the set by flaring them outwardly to opposite sides of the saw blade. The cutting rod, which preferably is also slightly greater than the width of the body of the blade, is received in this valley defined between teeth, as will be seen in FIG. 3. Rod 17 preferably has a diameter (FIG. 3) slightly greater than the distance between the outermost tips of the teeth. The tips of the teeth then hold the rod against lateral displacement. Couplings, as hereinafter described, apply sufficient tension to the rod so that it is drawn up tightly against the teeth. Thus the rod is formed in curvilinear disposition which enables the rod to cut through hard materials in a self starting fashion. The use of the saw teeth, as a support for the rod, not only provides the rigid curvilinear support but also provides a plurality of heat dissipation air spaces between teeth and between the rod.

The curvilinear nature of the blade allows the rod to be stretched against the curve of the blade and the rod is, therefore, easily fitted into its cutting position while being supported by the blade. With the curvilinear nature of the blade, the precision of fit between the end attachments, teeth and rod need not be as precise as would be the case with a straight saw tooth cutting edge.

Figure 4:
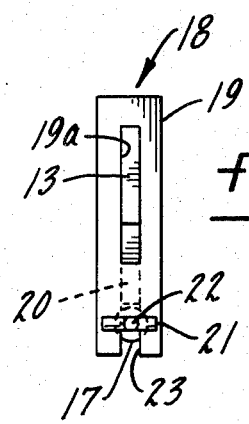
FIG. 4 is rear view of one end of the rod saw illustrated in FIG. 2, taken on the section line 4—4 of FIG. 2.
Figure 5:
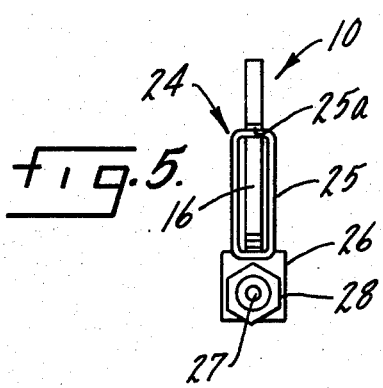
FIG. 5 is an end view of the coupling facilities at the forward end of said saw body and taken on the section lines 5—3 of FIG. 2.

Rod 17 is adapted to be held on the blade body and against the teeth by means of detachable couplings at opposite ends of the blade body. For example, a first coupling designated generally at 18 is carried by the shank end. As will be noted in FIGS. 2 and 4, coupling 18 is comprised of a strap 19 having a slot 19a through which the shank end of the blade is received. The strap is adapted to bear against a shoulder 20 at the shank end. Slot 19a has a configuration matching the cross-section of the blade shank next to the shoulder, as shown.

One end of the rod 17 carries an abutment in the form of a short transversely extending end piece 21 which is formed on a reduced end 22 of the rod. The reduced end 22 is received through a slot 23 opening through the bottom of the strap.

The other end of the rod is held on the other end of the blade by another detachable coupling generally designated at 24. Coupling 24 may take the form of a strap 25 shaped to fit over and embrace the forward end of the blade body. A notch or recess 25a is formed in the top side edge of the blade so that one edge of the strap may be seated therein to restrict displacement of the strap from the blade. The saw tooth side of the strap carries a laterally extending flange 26 having an aperture. The reduced other end 27 of rod 17 is received through this aperture and is threaded. A nut 28 is threaded on this end 27 and is adapted to bear against flange 26. By rotating nut 28, tension is applied to the rod 17 so as to draw it snugly against the teeth 10a.

FIG. 6 shows a modified tension applying strap for rod 17. In FIG. 6 the reduced end portion 27 of rod 17 at the outer end of the blade is provided with an abutment in the form of a transversely extending crosspiece 29 similar to piece 21 in FIG. 4. A cap 30 is received over the outer end of the blade in a fashion similar to the strap 25 in FIG. 2. This end of the blade may be provided with a notch or undercut 30a to facilitate positioning of the cap on this end of the blade.

In FIG. 6 cap 30 carries an outwardly extending projection which is threaded to define a bolt 31. A nut 33 is threaded on the bolt and is adapted to bear against a sleeve 34 which is freely received on the bolt. Sleeve 34 includes a slotted end similar to the slot 23 in FIG. 4 for receiving the reduced end portion 27 of the rod. By rotating the nut outwardly, pressure is exerted against the sleeve to exert tension on rod 17, while rotation in the opposite direction releases tension so that the rod may be removed as desired. The outer end of the bolt may be upset as at 35 to prevent removal of the sleeve and nut therefrom.

FIGS. 7 and 8 illustrate a modified form of the invention.

In FIGS. 7 and 8 blade 10 and the shank end coupling 18 are identical to that of FIGS. 1–6. The cutting rod 17 is formed in the same manner previously described except that the forward end portion of the rod is modified for connection with a resilient coupling 36. Coupling 36 includes a strap 37 having a slot 38 through which the forward end 39 of the blade is received in a fashion similar to the reception of the shank end of the blade through the strap 19. The side of the blade edge opposite to the saw tooth side is slotted or undercut to provide a shoulder as at 40. The strap 37 may be seated in this slot, as is seen in FIG. 7. Strap 37 includes an aperture 41 through which the forward end 42 of the rod 17 is received. The forward end 42 of the rod 17 is threaded as at 43 to receive a nut 44. A coil spring 45 is adapted to be received over the end 42 of the cutting rod 17 and compressed by the nut 44 and strap 37.

In FIGS. 7 and 8, the cutting rod is positioned over the saw teeth in the manner previously described and nut 44 is rotated to compress the spring 45. The spring exerts an outward biasing force on the nut and thereby the rod 17 so that the rod 17 is resiliently tensioned along its length. When the blade is used, rod 17 becomes heated and may elongate due to the rise in temperature. Spring 45 compensates for this elongation by exerting tension along the length of the rod. When the rod elongates, spring 45 will take up slack by pulling the rod 17 outwardly and thus keep it against the backing defined by the saw teeth.

While the rod is preferably used with a curvilinear blade as described, the rod and couplings may be used with a straight saw blade as long as the couplings are formed to hold the rod against the teeth of the blade.

The convertible blade is easily used for relatively soft materials by removing the couplings from the ends of the blade in which case the blade may be used with a power tool for reciprocation thereof or with a manipulating handle. For harder materials the cutting rod 17 is easily fitted over the blade by fitting the couplings at the ends of the blades and then tensioning the rod against and within the tips of the blade tooth in the manner aforementioned. When the rod is used, the thickness of the rod is such as to protect the teeth from any substantial damage thereto as a cut is being made in relatively hard materials.

When the rod is used in "self starting" fashion, the couplings and rod may be removed after a hole is formed through a workpiece. The blade is then inserted in the hole and the couplings and rod reattached.

I claim:

1. A convertible saw blade including an elongated flat saw blade having a shank end portion formed and adapted for reception of a manipulating means, the other end portion of said blade body being formed with a curved side edge, said curved side edge being formed substantially on a radius struck about a center positioned to one side of said body and inwardly of the extreme ends of said body, said one side edge being provided with saw teeth, said teeth having predetermined sets to the sides of said body to define a generally V-shaped groove when the teeth are viewed from the end of said body, an elongated rod of wear resistant material positioned over said side edge and between the tips of said teeth, and means at the opposite ends of said body for holding said rod snugly against said teeth.

2. The structure of claim 1 wherein said last named means includes means for tensioning said rod along the length thereof and pulling it snugly against the teeth of said body.

3. The structure of claim 1 wherein said last named means includes a detachable coupling at the shank end of said body and a detachable coupling at the other end of said body, one of said couplings including a threaded fastener for applying tension to said rod.

4. The structure of claim 1 wherein said rod is formed from a tungsten carbide material having cutting grains embedded therein and exposed through the surface of said rod for a cutting action.

5. The structure of claim 1 wherein said rod is positioned against said teeth while leaving air spaces extending from side to side of said body between said teeth.

6. The structure of claim 1 wherein said rod has a cutting length with a diameter slightly greater than the span between adjacent saw teeth.

7. A saw blade for use in cutting hard metals, glass and equivalent hard materials, including an elongated body having a shank end portion adapted to be received by a manipulating means, one side edge of said body being provided with teeth with alternate teeth along said edge being bent outwardly to define a distance between alternate teeth greater than the width of said body, an elongated cutting rod of wear resistant, abrasive particle carrying material positioned over and between the tips of said teeth, and means carried by the shank end and other end portion of said body for applying tension to said rod to draw it snugly against and within the tips of said teeth, said rod having a diameter slightly greater than the thickness of said body.

8. The structure of claim 7 wherein said one side edge is curvilinear.

9. The structure of claim 7 wherein said teeth define saw teeth for use with other materials when said rod is detached from said body.

10. The structure of claim 7 wherein said detachable means includes a strap carried by said shank end of said body and a detachable strap fitted over the other end of said body, one end of said rod having abutment means engageable with one strap, and the other end of said rod having adjustable abutment means for engagement with the other strap to thereby apply tension to said rod.

11. The structure of claim 7 wherein said rod is held on said blade at the forward end of the blade by a resilient coupling providing tensioning forces to said rod to compensate for elongation and contraction of said rod due to temperature changes.

* * * * *